United States Patent [19]

Brickerd, Jr.

[11] 4,000,517
[45] Dec. 28, 1976

[54] REMOTELY CONTROLLABLE RECORDER

[75] Inventor: Millard S. Brickerd, Jr., Panama City, Fla.

[73] Assignee: The United States of America as represented by the Secretary of the Navy, Washington, D.C.

[22] Filed: Nov. 10, 1975

[21] Appl. No.: 630,603

[52] U.S. Cl. .................. 360/74; 179/100.1 DR; 179/100.1 VC; 360/61

[51] Int. Cl.² .................. G11B 19/02; G11B 5/00

[58] Field of Search .................. 360/55, 61, 62, 71, 360/74; 179/100.1 VC, 100.1 DR

[56] References Cited

UNITED STATES PATENTS

| 3,011,030 | 11/1961 | Langendorf | 179/100.1 VC |
|---|---|---|---|
| 3,347,996 | 10/1967 | Uchikoshi | 360/62 |
| 3,555,202 | 1/1971 | Wanke | 179/100.1 DR |
| 3,735,054 | 5/1973 | Poshimura | 179/100.1 VC |
| 3,930,266 | 12/1975 | Okamoto | 360/62 |

Primary Examiner—Raymond F. Cardillo, Jr.
Attorney, Agent, or Firm—Richard S. Sciascia; Don D. Doty; Harvey A. David

[57] ABSTRACT

Apparatus is described for remote VOR (voice operated relay) control of a tape recorder having a single control element, e.g., a push-button, for effecting both pause and run functions on alternate actuations. A function feedback signal conditions a logic network so that solenoid actuation of the push-button occurs only in response to appropriate VOR logic command signals.

10 Claims, 1 Drawing Figure

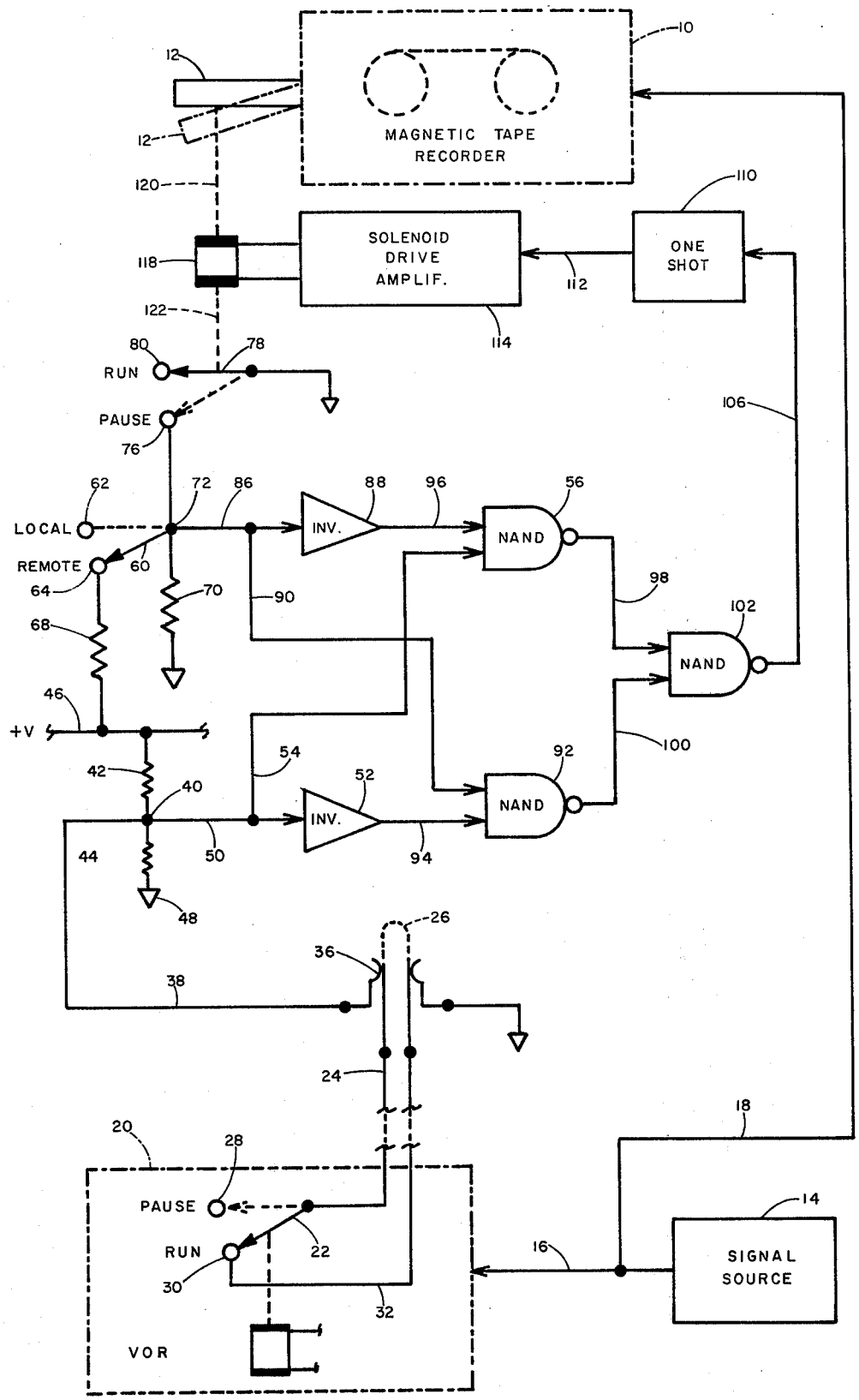

REMOTELY CONTROLLABLE RECORDER

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to signal recorders such as use a magnetic recording medium, and more particularly to the adaptation for remote control operation of recording instruments designed for local operation.

DISCUSSION OF PRIOR ART

In order to make maximum use of the recording medium, e.g., magnetic tape, it has been the practice to start the medium drive when signals are to be recorded, and to interrupt the drive when there is to be an extended pause in recording. This has been effected in various ways, for example, by means of a manual switch or a VOR (voice operated relay) that applies or interrupts power to the drive motor, or by mechanically or electrically disengaging the drive mechanism from the recording medium. The latter has the advantage of reduced inertia effects whereby the medium can more rapidly be stopped and brought to speed, thereby avoiding distortion, avoiding loss of the beginning of signals to be recorded, and effecting further savings of recording medium. Recording instruments have been provided wherein the start/stop or "pause" functions can be controlled remotely by electrical signals, relays, and solenoids.

Many recorders, particularly of the magnetic tape type, are in existence which comprise a "record/stop" or "pause" control in the form of a manually depressible push-button or key, and wherein alternate actuations of the same control element alternatively start and stop the recorder. Now, it would be desirable to be able to actuate such a control in response to remote VOR means, and so to provide the associated recorder with both local and remote operational control capability.

Because of the alternating start and stop functions of the single control element in the type of recorder being discussed, simple solenoid actuation thereof in direct response to VOR signals will not suffice since any spurious signal, or signal of insufficient duration, would put the system out of synchronism.

SUMMARY OF THE INVENTION

The present invention aims to solve the foregoing problem so as to make available for remote control use many recorders of the type using a single alternating start/stop control element, through the provision of a novel logic circuit in combination with a VOR and control element actuating solenoid means.

With the foregoing in mind, it is principal object of the invention to provide an improved recorder remote control system that permits remote operation of recorders having a start/stop or pause/run functions controlled by alternate actuations of a single control element.

Another object of the invention is the provision of a recorder remote control system utilizing novel logic circuitry to achieve actuation of the control element in the proper sequence to avoid loss of synchronism between the recording function of the recorder and VOR commands corresponding to the generation of signals sought to be recorded.

Still another object is the provision of a remote control system for a magnetic medium recorder, which system is compatible with selective operation of the recorder in a locally controlled mode.

Other objects and many of the attendant advantages will be readily appreciated as the subject invention becomes better understood by reference to the following detailed description, when considered in conjunction with the accompanying drawings.

DESCRIPTION OF THE DRAWINGS

The sole FIGURE is a diagrammatic illustration of a remotely controllable recording apparatus embodying the invention.

DESCRIPTION OF THE PREFERRED EMBODIMENT

In the form of the invention illustrated in the drawing and described hereinafter, a magnetic tape recorder 10 comprises a "pause" control element in the form of a push-button 12. Recorder 10 is of conventional, known construction wherein the tape drive motor runs continuously and a clutching mechanism is operated by push-button 12 to start and stop the tape motion. In this preferred embodiment, the push-button 12 is manually depressible from a "run" position to a "pause" position, shown respectively in full and dotted lines. Push-button 12 latches in its dotted line position until pressed again, whereupon it is unlatched for return to the full line position. Accordingly, alternate actuations of the push-button 12 will aternately stop and start the tape motion, that is to say, will cause the tape to pause or to run.

The invention contemplates the actuation of the push-button 12, or pause control element, in response to speech or other input signals sought to be recorded, so that the tape will run only during periods of recordable signals, and will pause during periods when such signals are absent. In the present example, 14 represents a source of more or less intermittent electrical signals to be recorded. Thus, signal source 14, in this example, may be regarded as comprising a microphone, although the invention contemplates other sources such as a periodically operated condition sensor in a scientific data collection system, or the like. The electrical signals to be recorded are applied, as shown by lines 16 and 18, to a voice operated relay means 20 and to the recorder 10.

Relay means 20 may be of any well known construction comprising suitable amplifying and signal detection circuitry for operating a relay contactor 22 between first and second switching positions in response to predetermined input signals on line 16. Contactor 22, which is connected by a conductor 24 to one side of a jack plug 26, is moved from a "pause" contact 28 to a "run" contact 30 whenever signals commence on line 16, and returns from contact 30 to contact 28 when those signals have ceased for some predetermined time period. Contact 30 is connected by a conductor 32 to the other side of plug 26.

Plug 26 is received in a jack 36 connected by a conductor 38 between a junction 40 of a voltage divider comprising resistors 42 and 44 connected between a positive voltage source 46 and a ground connection 48. It will be understood that the term "ground connection" is not limited to a true ground, but may include a common, chassis or other connection at substantially zero potential.

When the VOR is actuated by presence of a recordable signal, a circuit may be traced from point 40 through conductors 38, 24, contactor 22, contact 30, and conductor 32 to ground. Thus, point 40 will thereby be held at zero potential. This may be considered a logical 0 or "run" command condition. When contactor 22 moves from its illustrated position, the potential at point 40 rises to a value representative of a logical 1 or pause command condition.

Point 40 is connected as shown by line 50, to provide a logical 0 or a 1 as the input to an inverter 52, and by line 54 as one input to a NAND gate 56.

Selection of whether the recorder 10 is to have its pause control push-button 12 actuated manually or in response to input signals to the VOR commands is determined by positioning of a local/remote selector switch 60 to engage either a "local" contact 62 or a "remote" contact 64. When switch 60 is in its illustrated remote selecting position on contact 64, a circuit may be traced from voltage source 46 through a resistor 68, switch 60, and a resistor 70 from point 72 to ground.

Point 72 is further connected, via a conductor 74, to a "pause" contact 76 engageable by a feedback switch 78 which is connected to ground. Switch 78 is connected for movement between contact 76 and a "run" contact 80 in accordance with movements of push-button 12 between corresponding pause and run positions thereof, all in a manner which will be made apparent as the specification proceeds.

When switches 60 and 78 are in their illustrated positions, resistors 68 and 70 form a voltage divider that provides a voltage at point 72 corresponding to a logical 1. If the position of switch 78 is changed to engage contact 76, point 72 is grounded and represents a logic condition of 0. If selector switch 60 is moved to contact 62, the connection to the voltage source is lost and point 72 will exhibit a logical 0 irrespective of the position of switch 78. Considering the illustrated positions of switches 60 and 78 to constitute logical 1 conditions, and the reversed positions as logical 0 conditions, it will be seen that these switches may be regarded as an AND gate.

Point 72 is connected, as shown by line 86, to provide a logical 1 or a logical 0, depending upon the positions of switches 60 and 78, as the input to an inverter 88, and by line 90 as one input to a NAND gate 92.

The output of converter 52 is applied, as shown by line 94, as a second input to NAND gate 92. The output of inverter 88 is applied, as shown by line 96, as a second input to NAND gate 56. The outputs of NAND gates 56 and 92 are applied, as shown by lines 98 and 100, as the inputs to a NAND gate 102. The output of the latter is connected, is shown by line 106, to provide a logical 1 or 0 as an input to a monostable multivibrator, or one-shot 110.

One-shot 110 is triggerable only by a change from a logical 1 to logical 0, and when so triggered provides a 50 millisecond pulse on line 112 to a selenoid drive amplifier 114. Amplifier 114 is connected to actuate a solenoid 118 that is mechanically connected, as indicated at 120, to the pause control push-button 12.

Solenoid 118 is further mechanically connected, as shown at 122, to the feedback switch 78, already described as having positions corresponding to the run and pause positions of push-button 12.

MODE OF OPERATION

Consider the switches 22, 60, and 78 to be in their illustrated positions, as well as push-button 12. Under such circumstance, recordable signals are being transmitted via line 16 to the VOR, and via line 18 to the recorder 10, the tape of which is running. Also, under these circumstances a logical 1 will be present on each of lines 86, 90, 94, 98, and 106. Logical 0 will be present on each of lines 50, 54, 96, and 100.

If now the recordable signal ceases for a time greater than the period to which the VOR is insensitive, the switch 22 will move to contact 28 commanding a pause and changing the logic levels to 1 on lines 50, 54, and 100, and to 0 on lines 94 and 106. Since a change of 1 to 0 will trigger one-shot 110, a pulse is sent to the amplifier 114, and relay 118 causes push-button 12 to move to its latched-in, or pause, condition, along with switch 78, and the tape is stopped.

This movement of feedback switch 78 changes the logic levels to 0 on lines 86, 90, and 98, and changes the logic levels to 1 on lines 96 and 106. Recalling that one-shot 110 will only be triggered on a change of 1 to 0 on line 106, this change from 0 to 1 does not actuate the solenoid 118. The logic circuit is, however, conditioned to be triggerable upon the next change in the VOR contactor. Thus, when recordable signals are detected again by the VOR means 20, contactor 22 moves to run contact 30, changing logic levels to 0 on lines 50, 54, and 106, and to 1 on lines 94 and 98. The change on line 106 of 1 to 0 triggers the one-shot 110 and the solenoid 118 is pulsed causing push-button 12 to unlatch and return to its full-line or run position. This starts the tape moving to record the signals on line 18.

Feedback switch 78 is also returned to its full-line or run position, placing a logical 1 on each of lines 86, 90, 98, and 106, and a logical 0 on lines 96 and 100. Again, the logic means is placed in a triggerable condition.

It will be appreciated that the operation of the feedback switch and associated logic elements serves to ensure that a pause command from the VOR is effective to cause triggering of the one-shot 110 and actuation of the push-button 12 to change the run/pause status of the recorder 10 only if the recorder is actually in a run (tape moving) condition. Likewise a run command from the VOR will be effective to actuate push-button 12 only if the recorder is, in fact, in a pause condition. Thus, the invention assures that the VOR commands and the intended operations of the recorder 10 are coordinated, and that no loss of recordable signals will occur by reason of the recorder function being out of sync with the command.

When it is desired that the apparatus respond only to local manipulation of the push-button 12, the VOR input jack plug 26 is removed and the switch 60 is moved to contact 62. This allows the voltage of point 40 to rise and of point 72 to fall. As a result, no further logic level changes will occur on line 106 irrespective of actuations of VOR contact 22 or of changes in position of the feedback switch 78 with manual manipulation of push-button 12.

From the foregoing, it will be appreciated that the invention has accomplished the earlier stated objects and advantages, as well as others apparent from the description. It will also be appreciated that the control logic can be applied to recorders having other electrical or mechanical start/stop or run/pause controls than the push-button 12.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A recordable signal responsive remote control system in combination with a magnetic medium recorder including a run/pause function control element movable alternatively to first and to second operative positions by successive applications of an actuating force in one direction so as to cause the magnetic medium to be driven or stopped, respectively, said system comprising:
   electrically energizeable actuator means, connected to said control element, for applying said actuating force;
   feedback logic means, connected to said control element, for generating first and second logic signals corresponding to said first and second operative positions, respectively;
   run/pause logic command means, connected to said recorder, for generating third and fourth logic signals upon commencement and cessation respectively, of recordable signals;
   logic network means, responsive to said first, second, third, and fourth logic signals, for energizing said actuator means in response to said third logic signal only when said function control element is in said second operative position, and for energizing said actuator means in response to said fourth logic signal only when said function control element is in said first operative position.

2. A system as defined in claim 1, and wherein: said run/pause logic command means comprises a voice operated relay means.

3. A system as defined in claim 1, and wherein said actuator means comprises an electrical solenoid.

4. A system as defined in claim 1, and wherein said logic network means comprises:
   first inverter means, connected to said feedback logic means, for providing inverted first and second logic signals;
   second inverter means, connected to said logic command means, for providing inverted third and fourth logic signals;
   first NAND gate means, connected to said first inverter means and to said logic command means, for providing a fifth logic signal only upon coincidence of said inverted second logic signal and said fourth logic signal and a sixth logic signal at all other times;
   second NAND gate means, connected to said second inverter means and to said logic command means, for providing a seventh logic signal only upon coincidence of said inverted third logic signal and said first logic signal and an eighth signal at all other times; and
   third NAND gate means, connected to said first and second NAND gate means, for providing a ninth logic signal only upon coincidence of said sixth and said eighth logic signals and a tenth logic signal at all other times.

5. A system as defined in claim 4, and wherein said logic network means further comprises:
   one-shot means, connected to said third NAND gate means, for providing an actuator control pulse of predetermined time length in response to said ninth logic signal.

6. A system as defined in claim 5, and wherein: said run/pause logic command means comprises a voice operated relay means.

7. A system as defined in claim 6, and wherein said actuator means comprises an electrical solenoid.

8. A system as defined in claim 7, and further comprising: solenoid driving amplifier means connected between said one-shot means and said solenoid.

9. A system as defined in claim 8, and wherein said feedback logic means comprises switch means, operatively coupled to said control element.

10. A system as defined in claim 9, and further comprising remote/level selector means for selectively rendering said feedback logic means inoperative to provide said first logic signal.

* * * * *